United States Patent

[11] 3,611,142

[72] Inventor George R. Welti
Newton, Mass.

[21] Appl. No. 58,681
[22] Filed Sept. 27, 1960
[45] Patented Oct. 5, 1971
[73] Assignee Westinghouse Electric Corporation
Pittsburgh, Pa.

[54] COMMUNICATION SYSTEM WITH ADAPTIVE RECEIVER
13 Claims, 9 Drawing Figs.

[52] U.S. Cl. .......... 325/42, 325/418, 329/145, 329/146
[51] Int. Cl. .......... H04b 1/10
[50] Field of Search .......... 250/8.30, 20.7; 343/178, 179

[56] References Cited

UNITED STATES PATENTS

| | | | |
|---|---|---|---|
| 2,860,238 | 11/1958 | Dyke et al. | 250/20.7 |
| 2,896,162 | 7/1959 | Berger et al. | 250/20.7 |

*Primary Examiner*—Rodney D. Bennett, Jr.
*Assistant Examiner*—Daniel C. Kaufman
*Attorneys*—F. H. Henson and E. P. Klipfel CLAIM: 1. In a transmission system comprising a radio transmitter and receiver, wherein said transmitter includes means for producing binary pulse signals of baud duration and means for producing phase modulated radio waves in response to said signals, a receiver including radio wave receiving means, a pair of demodulators connected to said receiving means, a variable frequency oscillator having two phase displaced outputs connected to the demodulators, respectively, a delay means having a delay substantially equal to the period of said binary signals, a multiplier circuit connected to the output of one of said demodulators, said delay means being connected between the other demodulator and the multiplier circuit, an automatic frequency control circuit connected from the output of said multiplier circuit to said oscillator, and means connected to the output of the delay means and said other demodulator for deriving the transmitted signals.

PATENTED OCT 5 1971 3,611,142

INVENTOR
George R. Welti
BY
Moses, Nolte & Nolte
ATTORNEYS

INVENTOR
GEORGE R. WELTI
BY
Moses, Nolte & Nolte
ATTORNEYS

INVENTOR
GEORGE R. WELTI
BY
Moses, Nolte & Nolte
ATTORNEYS

INVENTOR
GEORGE R. WELTI
BY
Moses, Nolte & Nolte
ATTORNEYS

COMMUNICATION SYSTEM WITH ADAPTIVE RECEIVER

This invention relates to the transmission and reception of digital information over a noise perturbed channel, such as the moon bounce channel, ionospheric and tropospheric scatter channels, and submarine acoustical channels.

An object of the present invention is to transmit and receive digital information through a fluctuating channel with near optimum performance, simplicity, and flexibility in operational use.

Another object of the invention is to provide a matched receiver which is of relatively simple construction, does not require a matched filter, a waveform generator or waveform storage, except that occurring in a simple untapped delay line without feedback around it.

Another object is to provide a receiver which adapts itself to changes in transmitted wave forms, so that the same receiver is matched to a variety of transmitters without requiring any changes in its internal structure.

Still another object of the invention is to provide an improved biphase modulation carrier communication system.

The present invention relates to communication systems in which pulses having a given waveform are transmitted, preferably by modulation on a radio frequency carrier either by single sideband, double sideband or vestigial sideband modulation and wherein a matched receiver is used in which the transmitted signals are detected by comparison with waveforms corresponding to those which are transmitted. Such systems have been proposed for operation over a single path channel, but unlike the present system, are unsuccessful where operation is encountered over multipath or time dispersive channels.

Other objects and advantages of the invention will be made evident and the invention itself will be fully understood from the following description and the drawing, wherein.

Figure 1:
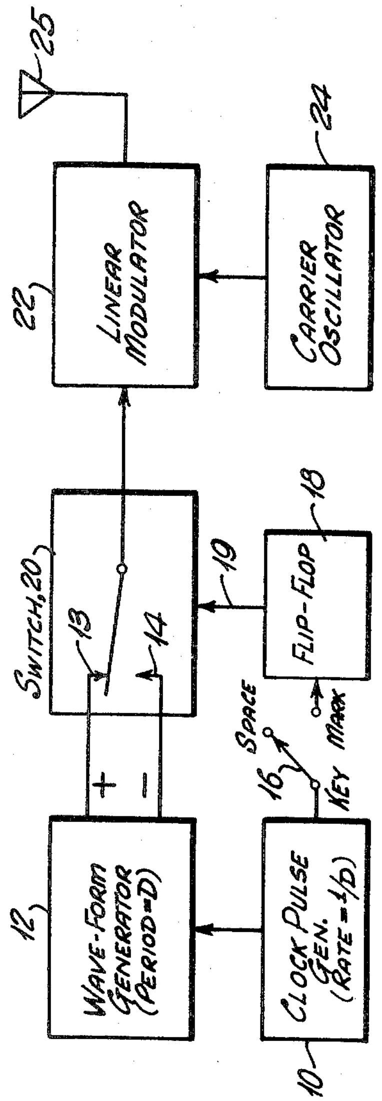
FIG. 1 is a block diagram binary radio transmitter.

The invention will first be explained with respect to a binary transmitter and receiver. A clock pulse generator 10 provides sharp pulses at a rate 1/D and supplies these pulses to a waveform generator producing pulses having a period equal to D, any suitable waveform, and positive and negative polarities at output terminals 13 and 14. A clock pulse is also supplied to a keyer 16 for sending space and mark signals. The mark terminal of keyer 16 is connected to a flip-flop circuit having a connection 19 to a suitable switch 20, such as a relay or an electronic switch. The output of switch 20 is fed to linear modulator 22 supplied with a carrier wave from an oscillator 24. The output of the modulator is then transmitted over an antenna 25 to the receiver. Keyer 16 is operated at a rate equal to 1/RD=1/T where R is an integer. It can be seen, therefore, that whenever the keyer is in the space position no signal is sent to flip-flop circuit 18 and switch 20 is not operated so that the same signal continues to be transmitted. On the other hand, whenever keyer 16 is placed in the mark position, one or more pulses is sent to flip-flop circuit 18 and switch 20 is operated one or more times accordingly. Thus, for each mark signal one or more waveforms from generator 12 is transmitted with a reversal of polarity. For simplicity it may be considered that keyer 16 is operated at the rate 1/D, then for each mark signal, switch 20 will be operated once and a pulse from generator 12 will be transmitted with a polarity opposite that of the pulse previously transmitted. Modulator 22 may produce suppressed carrier single sideband, double sideband or vestigial sideband modulation. However, for a given transmitted power, performance is optimized if a suppressed carrier system is employed. The carrier wave is transmitted with a phase of 0 or 180°, the phase being reversed by the modulator when a mark signal occurs.

Figure 2:
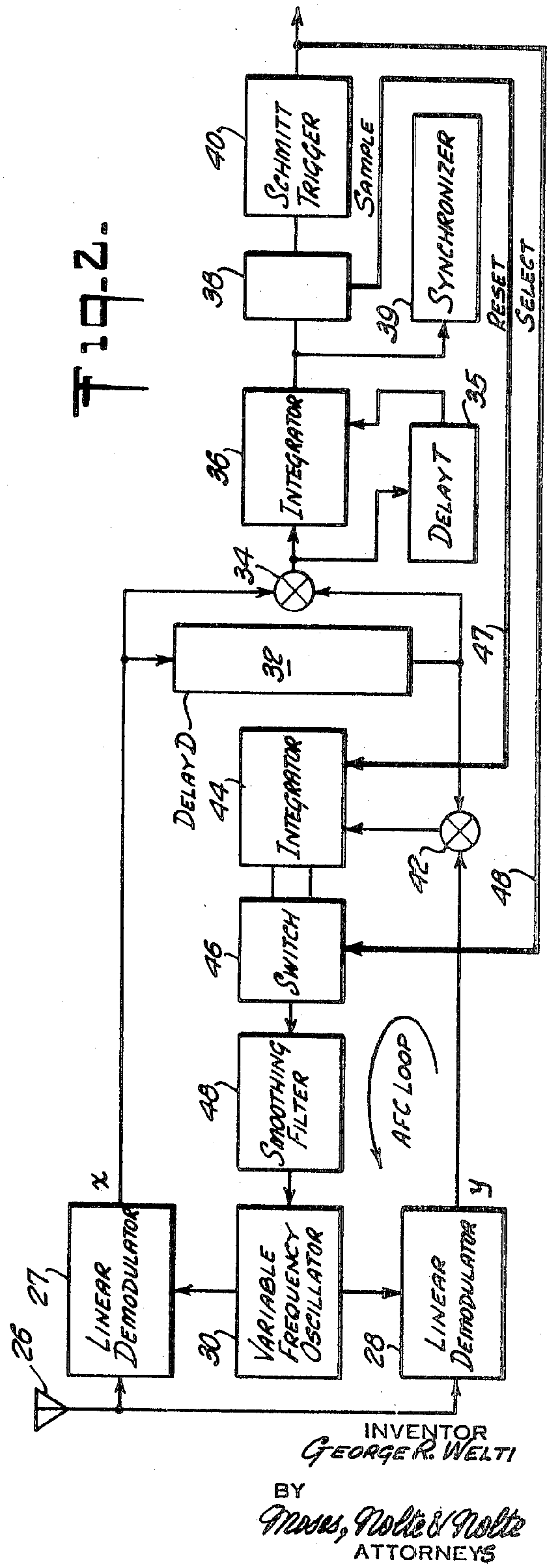
FIG. 2 is a circuit diagram of a binary receiving system.

Referring now to FIG. 2 the receiving system includes an antenna 26 connected to linear demodulators 27 and 28. A variable frequency oscillator 30 having a frequency substantially equal to the carrier frequency supplies waves-in-phase and in quadrature phase to demodulators 27 and 28. Demodulator 27 is connected to delay line 32 having a delay equal to D. If the oscillations supplied by oscillator 30 have a frequency which is precisely correct, the waveforms entering and leaving the delay line will be identical except for a possible change in polarity. If we call the output of the demodulators X and Y, then the delayed X-signal and the Y-signal are supplied to a multiplier 34 which produces a signal that is plus or minus the square of the base band signal, depending on whether a mark or space is being received. The multiplier output is integrated in the integrator or filter 36 provided with a finite delay device or memory 35 of length T which inverts the polarity of the signal. The integrator output is sampled by switch 38 at the end of each band interval. The sampled integrator output is supplied to Schmitt trigger circuit 40, which constitutes the final decision element of the receiver.

The receiver is also provided with an automatic frequency control, AFC, loop, which comprises a multiplier 42 supplied with the delayed X-signal and the quadrature Y-signal. The product of the multiplier contains a component proportion to $\sin\theta$ where $\theta$ is the phase angle through which the frequency error of the locally generated carrier "walks" or progresses during the period D. The polarity of this component is determined by whether or not a phase reversal took place in the transmission of the most recent baud. To obtain an error signal, then, we need only select the proper polarity of this component as determined by the final decision unit, namely Schmitt trigger circuit 40. For this purpose the output of multiplier 42 is supplied to integrator 44 and the polarity of the output of the integrator is switched by switch 46 operated over a suitable link 48 by the output of trigger circuit 40. It will be understood that switch 46 is shown schematically and may be a switching unit of any type, such as an electronic circuit which is switched at the end of each mark signal. The error integrator 44 is reset at the beginning of each baud interval in response to the output over conductor 47 of a synchronizing circuit 39 which also operates sampling switch 38. Switch 46 is connected to a smoothing filter 48 providing sufficient smoothing to discriminate against the unwanted fluctuating components in the error signal that result in the random cross products between he in-phase and quadrature signals. The smooth error signal at the output of filter 48 controls the tuning of oscillator 30 in a direction to reduce the absolute value of the frequency error.

Figure 3:
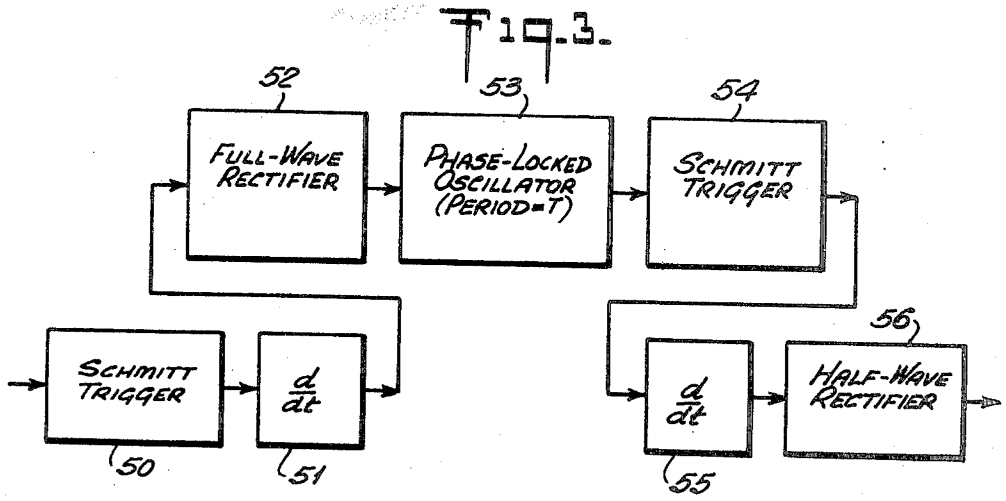
FIG. 3 is a block diagram of the synchronizer of the receiver of FIG. 2.
Figure 4:
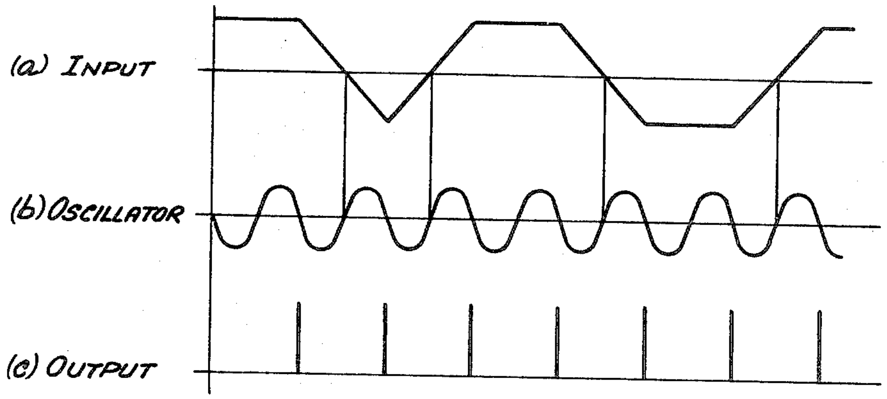
FIG. 4 is a diagram of waveforms explanatory of the operation of the synchronizer.
Figure 5:
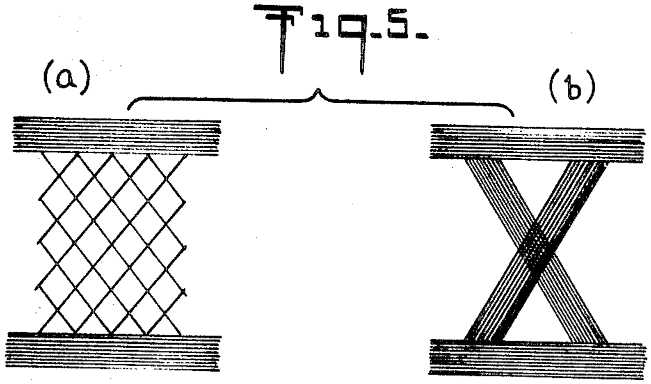
FIG. 5 is a diagram of patterns relating to the operation of the receiver.

The synchronizer 39, as shown in FIG. 3, preferably consists of a Schmitt trigger circuit 50 followed by differentiating circuit 51 and full wave rectifier 52. The input to the Schmitt trigger circuit 50 is a waveform of the type shown in FIG. 4, curve (a). Trigger circuit 50 detects the zero crossing of this waveform and after differentiation and rectification in circuits 51 and 52 supplies a train of positive spikes occurring at the zero crossing instants to phase locked oscillator 53 having a period T. The output of oscillator 53 is shown by curve (b) in FIG. 4. Negative going zero crossings of the last mentioned wave are detected by the Schmitt trigger circuit 54, followed by a differentiating circuit 55 and a half wave rectifier 56 to provide a final output consisting of a periodic train of voltage spikes occurring at the end of each baud interval as shown by curve (c) of FIG. 4.

The procedure for establishing initial lock-in of the AFC loop is as follows. The loop is open circuited and the oscillator 30 is tuned while the input signal to synchronizer 39 is observed. A suitable signal display can be obtained by using the synchronizer output to trigger the horizontal sweep of an oscilloscope whose vertical plates are connected to the synchronizer input signal. The display will be random or "garbage" until the oscillator frequency is nearly correct, at which time the display will begin to assume the pattern shown in FIG. *5a*. When the tuning is exact the display shown in FIG. *5b* will result and the operating mode of the receiver can be switched to AFC.

The two quadrature demodulators are required because of the multipath channel. In the moon bounce channel for example, these are necessary because the reflections from the moon occur at a multitude of discrete points each having a phase associated with it which is independent of other reflecting points. The reflected signal is therefore a superposition of a large number of replicas of the transmitted signal each with a random phase. This reflected signal may be considered to be composed of an in-phase and quadrature component, (with respect to a local oscillator as a reference).

Performance of the proposed system can be analyzed conveniently by starting with a frozen-channel analysis. The resulting formulas then can be reinterpreted readily for a fluctuating channel by placing certain constraint on systems parameters. The following analysis will be carried out in this way and will assume that the radiofrequency signal is narrow band. In the absence of noise the waveform of a received baud will have the form $$\pm[x(t)\cos(w_d t)+y(t)\sin(w_d t)],$$

where $x$ and $y$ are in the in-phase and quadrature components, respectively of the base-band waveform with respect to the desired radian frequency $w_d$ of the receiver local oscillator, and where the time $t$ has its origin at the start of a baud interval at the receiver. The desired frequency $w_d$ is equal to the frequency of the transmitted carrier and suitably weighted average of the Doppler shift introduced by the channel.

Let $w_a$ be the actual frequency of the receiver oscillator, and let $$\theta = w_a D$$

have an absolute value much smaller than one. Then the noisy base-band outputs of the in-phase and quadrature demodulators are $$\pm[x(t)\cos(k\theta)-y(t)\sin(k\theta)]+m_k(t)$$

and $$\pm[y(t)\sin(k\theta)+x(t)\cos(k\theta)]+n_k(t),$$

respectively during the $k$th baud interval, where $m_k$ and $n_k$ are the noise components. The output of multiplier A for $k=1$ is $$\pm[x(t)\cos\theta-y(t)\sin\theta+m_1(t)][x(t)+m_0(t)]$$

and the value of the signal entering the Schmitt trigger is $$\pm\int_0^D \{x^2(t)\cos\theta+x(t)[m_0(t)\cos\theta-y(t)\sin\theta+m_1(t)] + m_0(t)[-y(t)\sin\theta+m_1(t)]\}\,dt.$$

In cases of practical interest we will always have $\theta$ small; therefore, the integral is approximately $$\pm\int_0^D [x^2(t)-\theta x(t)y(t)]dt$$

when the input signal-to-nose ratio is high. When it is low we obtain $$\pm\int_0^D [x^2(t)+m_0(t)m_1(t)]dt.$$

These values may be compared with the corresponding value in the optimum receiver which is obtained when $\theta=m_o=0$, namely $$\pm\int_0^D [x^2(t)+x(t)m_1(t)]dt.$$

We see that for a Rayleigh channel in the high-signal case we have an "effective noise" of $\theta\, y(t)$, whereas in the high-noise case, the effective noise is the actual noise amplified by the signal-to-noise r.m.s. voltage ratio.

For a given average transmitter power, a given signal-to-noise ratio is always inversely proportional to the radiated bandwidth. At low bandwidth, the signal-to-noise ratio is high, and the effective signal-to-noise ratio is independent of bandwidth. On the other hand, the output signal-to-noise ratio which is equal to the effective signal-to-noise ratio multiplied by D times the bandwidth, increases with bandwidth. Therefore, the radiated bandwidth should not be too low.

As the bandwidth is increased, the signal-to-noise ratio decreases. When the ratio is $1/\theta$ or 1, the effective signal-to-noise ratio is 1/3. As the bandwidth is increased further, the effective signal-to-noise ratio decreases faster than the bandwidth increases, so that the output signal-to-noise ratio also decreases. We find that the optimum bandwidth is one at which the signal-to-noise ratio is near unity, and that the loss in performance at this point is about 5 db. when compared with an optimum receiver. We shall see that the actual loss for the fluctuating channel is less than 5 db.—for two reasons.

If we now "unfreeze" the channel and allow it to fluctuate, the optimum receiver will perform more poorly than the optimum receiver for the frozen channel. Furthermore, the present receiver will give better performance than is indicated in the above analysis for the frozen channel. The reason for better performance lies in the fact that the angle $\theta$ now becomes a random variable both of $t$ within a baud, and from baud to baud. The effect of $\theta$ being random is to reduce the contribution of terms containing $\theta$ in the integrands above. The effective noise is therefore less than before, and the loss is correspondingly reduced.

The method of frequency stabilization used in the proposed system bears a superficial resemblance to a known scheme of phase tracking. However, the two systems differ in an essential way. The known system derives the error signal from the produce of the two quadrature components of the received waveform. In the proposed system the two quadrature components of the received waveform are time-shifted with respect to each other prior to multiplication. The following analysis shows how this time shift affects the average value of the output of the multiplier in the AFC loop.

Consider the known system and let $x$ and $y$ be the in-phase and quadrature components of the received signal with respect to the ideal local carrier with a proper phase, and let the actual local carrier phase be $\theta$. Then the error signal is the average of $$p=\int(x\cos\theta-y\sin\theta)(x\sin\theta+y\cos\theta)dt,$$

where the bracketed factors are the actual demodulator outputs. If the order of integration and averaging is reversed, we have an error signal $$\epsilon=\bar{p}=\frac{\sin(2\theta)}{2}\int(\overline{x^2}-\overline{y^2})dt+\frac{\cos(2\theta)}{2}\int\overline{xy}\,dt.$$

The above formula gives the error signal in the phase tracking loop for any kind of channel. For many physical channels of interest we have $$\overline{x^2}=\overline{y^2} \text{ and } \overline{xy}=\theta,$$

in which case $\epsilon$ becomes zero and control is lost. For single-path channels $$\overline{y^2}=\theta \text{ and}$$

$$\epsilon=\frac{\sin(2\theta)}{2}\int\overline{x^2}\,dt.$$

We see that the known scheme supplies the desired error signals for single-path channels but breaks down when used with time-dispersive channels. We shall find that this deficiency is overcome in the scheme proposed here.

In the proposed scheme we require frequency tracking rather than phase tracking. Let $\theta$ be the phase runout per baud interval caused by an erroneous local carrier frequency. Our error signal will be the average of $$p=\int (x \cos \theta + y \sin \theta) y \, dt$$

or $$\epsilon=\bar{p}=\sin \theta \int \overline{y^2} \, dt.$$

Clearly, control is retained in the multipath situation. In the single-path situation, the present scheme will give in-phase control with the same performance as the known scheme.

Figure 6:
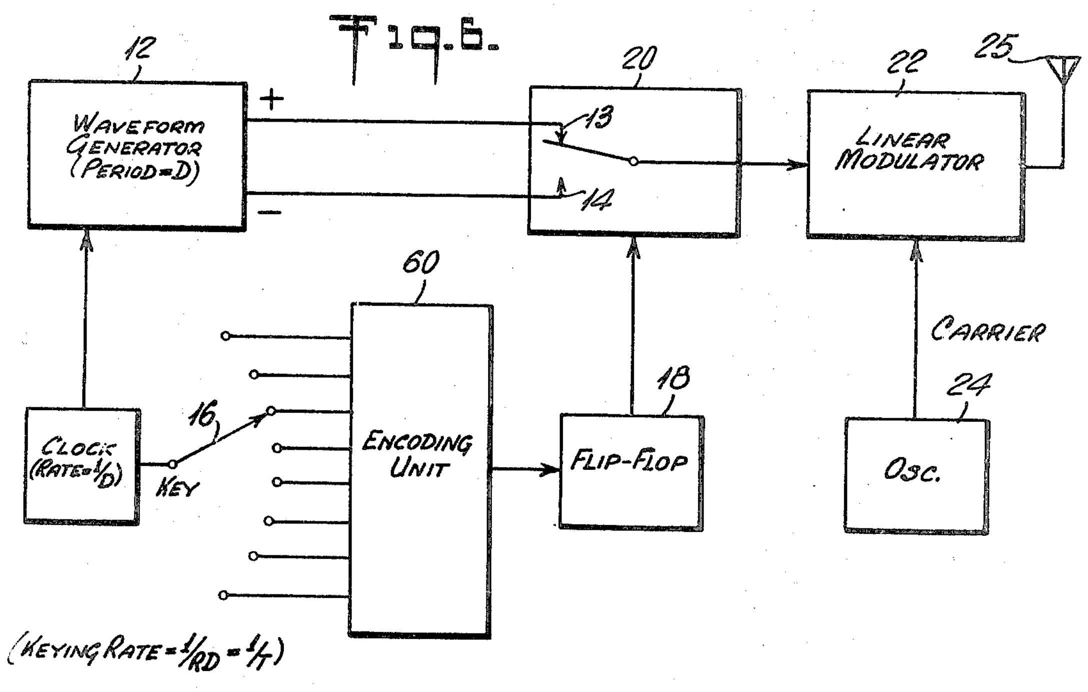
FIG. 6 is a block diagram of an orthogonally coded signal transmitter.
Figure 7:
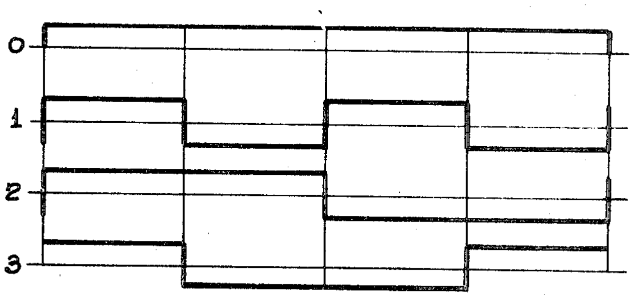
FIG. 7 is a diagram showing a set of orthogonal wave forms.
Figure 8:
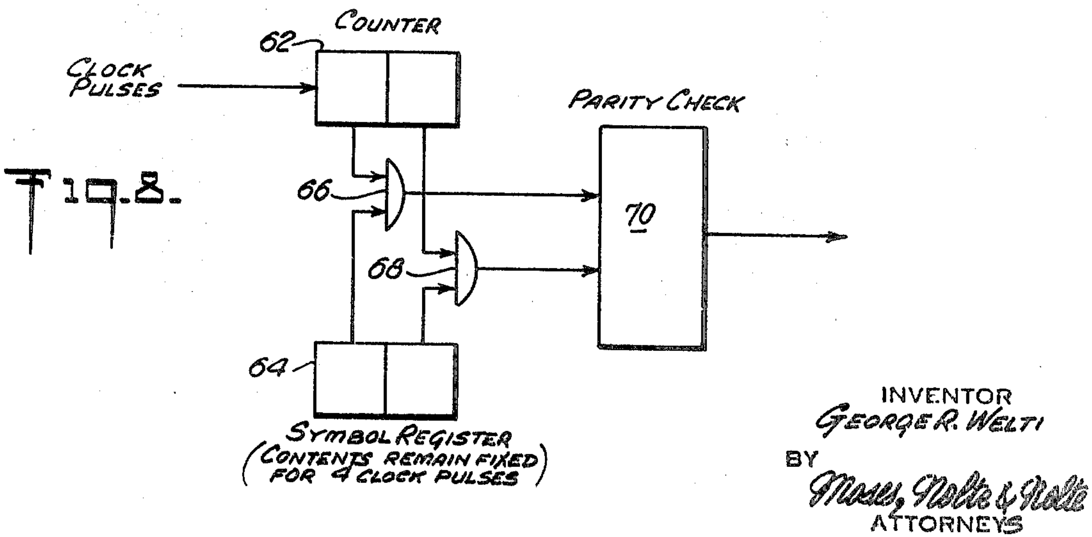
FIG. 8 is a block diagram of a circuit for generating orthogonal waveforms.

The invention will now be described with reference to a system using orthogonally coded signals. The orthogonally coded transmitter shown in FIG. 6 has the same elements as the binary transmitter shown in FIG. 1 except that flip-flop circuit 18 is operated by an encoding unit 60 which produces a sequence of R operations on the basis of any one of 2R inputs. If R equals 4, the encoding unit will have eight inputs. It may be assumed that the encoding unit produces square waves with excursions between +1 and −1. The square waves or their negatives may be of the type known as Walsh functions and the four Walsh functions corresponding to R=4 are illustrated in FIG. 7. These square waves have the property of being either mutually orthogonal or negative; that is, the integral of their cross products is either zero or −RD. Each square wave train shown in FIG. 7 has a duration T. Circuits for generating Walsh functions are known in the prior art. A circuit for generating the Walsh functions may take the form indicated in FIG. 8 which comprises a two-stage binary counter 62 to which the clock pulses are supplied and a two-stage symbol register 64 for storage of a two-digit binary number. Counter 62 and symbol register 64 are connected to a pair of coincidence circuits 66 and 68. The coincidence gates are connected to a parity check circuit which produces an output pulse which is positive or negative depending on whether an even or an odd number of pulses are supplied thereto. As the switch 16 of FIG. 6 is placed on one of the eight taps of encoding unit 60, one of the four Walsh functions or a negative thereof is generated and supplied to the flip-flop circuit 18 which actuates the switch 20 accordingly.

Clock pulses enter binary counter 62 at the rate of 1/D. A two-digit binary number is stored in register 64 during four successive intervals of length D. The contents of counter 62 will be 00, 01, 10, and 11, and the contents of the register will remain fixed, being determined by the "Index No." associated with a specific Walsh function. For example, if the Walsh function whose index is 1 is to be generated, then the contents of register 64 will be 01. The outputs of coincidence circuits 66 and 68 will be 1 if both inputs are 1, otherwise the outputs will be 0. Thus during the four successive baud intervals the output of circuit 66 will be o, 0, 0, 0 and the output of circuit 68 will be 0, 1, 0, 1. Parity check unit 70 will generate an output pulse whenever an odd number of its inputs are 1. Thus, the output of 70 will be 0, 1, 0, 1. If we now interpret the final output 0 as indicating a positive pulse and the output 1 as indicating a negative pulse we see from FIG. 7 that we have generated the Walsh function whose index is 1.

Figure 9:
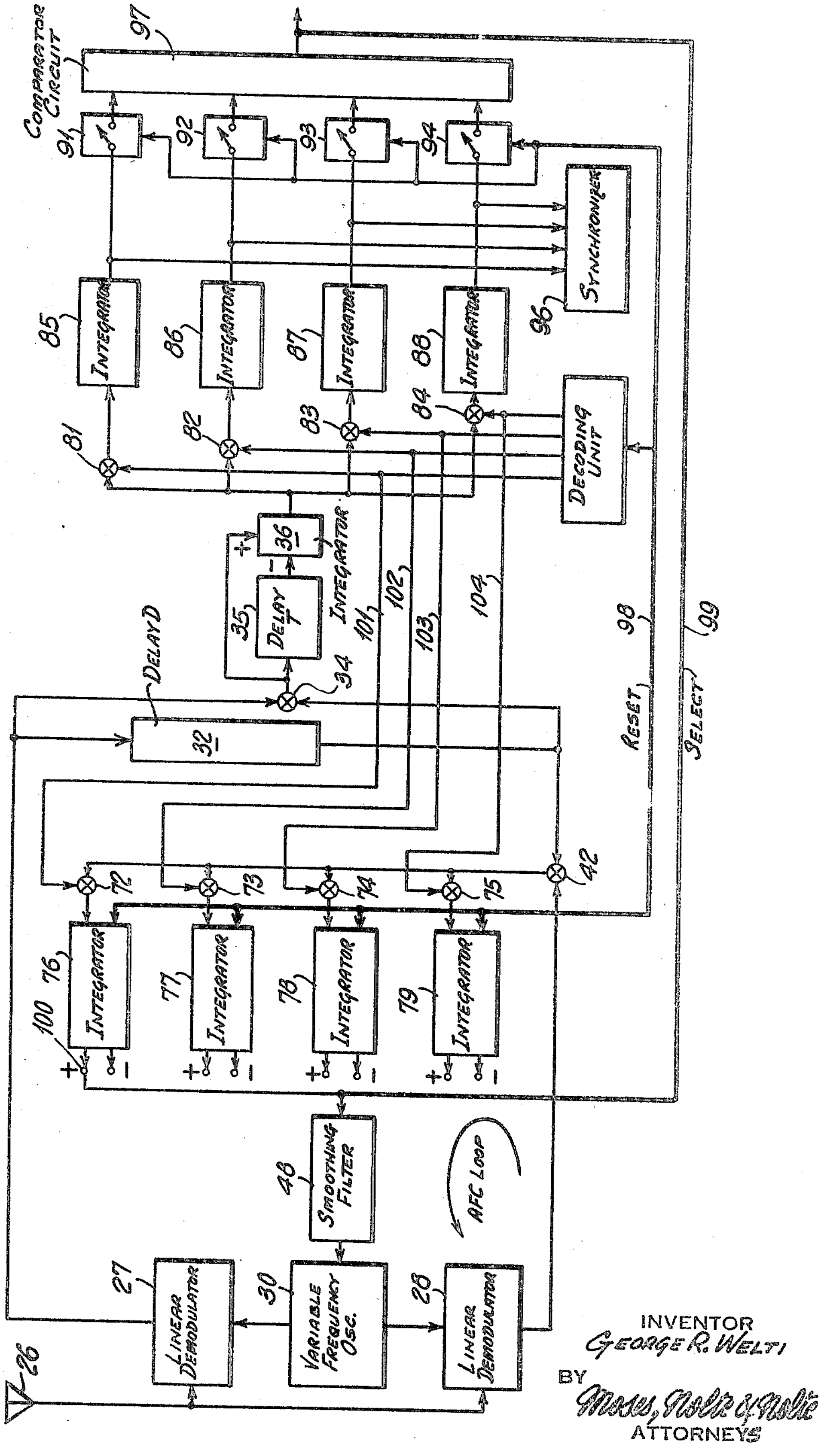
FIG. 9 is a receiver for orthogonally coded signals.

The receiver for the orthogonally coded signals is shown in FIG. 9 and includes an antenna 26 connected to linear demodulators 27 and 28 supplied with quadrature phase signals by a variable frequency oscillator 30. Oscillator 30 is controlled by an AFC circuit similar to that of FIG. 2, except that between he multiplier 42 and the smoothing circuit 48 there are four channels including multipliers 72, 73, 74 and 75 connected to integrators 76, 77, 78 and 79. Following the delay circuit 35 and the integrator 36 are also four channels connected in parallel and including multipliers 81 to 84 and integrators 85 to 89. A decoding unit 90 generates the positive starting Walsh functions and these in turn are supplied to the multipliers 81 to 84 to demodulate the outputs in the four channels. After passing through integrator circuits 85 to 89, the four outputs are sampled by switch 91 and 94 and supplied to a comparator circuit 96 which determines the channel containing the greatest energy together with the polarity of that channel. This identification amounts to an identification of the transmitted signal. The sampling switches 91 to 94 are operated by a synchronizing circuit 96 in a manner similar to that described in connection with FIG. 2. The output of the synchronizing circuit is also supplied to the decoding unit 90 and over the reset connection 98 to reset integrators 76 to 79 at the end of each signal. A cable 99 feeds the output of the comparator circuit 96 to the switching circuit 100 for controlling it in accordance with the output of the comparator circuit so as to connect one of the integrators 76 to 79 to the smoothing circuit 48. It will be recognized that the cable 99 for operating the selection switch 100 may actually consist of a number of conductors, for example eight conductors, for supplying the output signals of the various channels to the selection switch 100. The outputs of the decoding unit are supplied over conductors 101 to 104 to multipliers 72 to 75 to demodulate the signals supplied to integrators 76–79.

I claim:

1. In a transmission system comprising a radio transmitter and receiver, wherein said transmitter includes means for producing binary pulse signals of baud duration and means for producing phase modulated radio waves in response to said signals, a receiver including radio wave receiving means, a pair of demodulators connected to said receiving means, a variable frequency oscillator having two phase displaced outputs connected to the demodulators, respectively, a delay means having a delay substantially equal to the period of said binary signals, a multiplier circuit connected to the output of one of said demodulators, said delay means being connected between the other demodulator and the multiplier circuit, an automatic frequency control circuit connected from the output of said multiplier circuit to said oscillator, and means connected to the output of the delay means and said other demodulator for deriving the transmitted signals.

2. A system according to claim 1, wherein said automatic frequency control circuit includes integrating means connected to the output of said means for deriving, switching means for reversing the polarity of the output of the integrating means in response to a signal of said one value, and a smoothing circuit connecting said switching means to said oscillator.

3. A system according to claim 2, including means for resetting said integrating means to a reference voltage value at the end of each baud interval.

4. A system according to claim 1, wherein said last mentioned means includes a second multiplier connected to the output of said delay means and said other demodulator, an integrating circuit having a pair of inputs one of which is connected to the output of said second multiplier, additional delay means for supplying the output of the multiplier with a delay equal to the baud duration and with a reversal of polarity to the other of said pair of inputs of the integrating circuit, means for sampling the output of said integrating means at the end of each baud interval, and means for detecting the voltage polarity of the sampled outputs to indicated the values of the binary transmitted signals.

5. A transmission system comprising a radio transmitter and receiver, said transmitter including means for producing and transmitting a carrier wave modulated by binary signals, said receiver including means for receiving said carrier wave, a pair of demodulators connected to said receiving means, a tunable oscillator having two outputs connected to the demodulators, respectively, in phase quadrature relation, delay means having a delay substantially equal to the period of the binary signals, a multiplier circuit connected to the output of one of said demodulators, said delay means being connected between the other demodulator and the multiplier circuit, an automatic frequency control circuit connected from the output of said multiplier circuit to said oscillator, and means connected to the output of the delay means and said other demodulator for deriving the transmitted signals.

6. A transmission system comprising a radio transmitter and receiver, said transmitter including a generator producing positive and negative pulses, a modulator including a source of radio carrier waves, keying means for selectively connecting the pulse generator to the modulator so as to change the polarity of the pulses supplied thereto in response to a keying signal having one given value, said receiver including radio wave receiving means, a pair of linear demodulators connected to said receiving means, a tunable oscillator having two outputs in phase quadrature connected to the demodulators, respectively, a delay means having a delay substantially equal to the pulse period of the pulse generator, a multiplier circuit connected to the output of one of said demodulators, said delay means being connected between the other demodulator and the multiplier circuit, an automatic frequency control circuit connected from the output of said multiplier circuit to said oscillator, and means connected to the output of the delay means and said other demodulator for deriving the transmitted signals.

7. A system according to claim 6, wherein said automatic frequency control circuit includes integrating means connected to the output of the multiplier circuit, switching means for reversing the polarity of the output of the integrating means in response to a signal of said one value, and a smoothing circuit connecting said switching means to said oscillator.

8. A system according to claim 7, including means for resetting said integrating means to a reference voltage value at the end of each baud interval.

9. A system according to claim 8, wherein said means for deriving the transmitted signals includes a second multiplier connected to said delay means and said other demodulator, a second integrating circuit having a pair of inputs one of which is connected to the output of said second multiplier, delay means for supplying the output of the second multiplier with a delay equal to the baud duration and with a reversal of polarity to the other of said pair of inputs of the second integrating circuit, means for sampling the output of said second integrating means at the end of each interval, and means for detecting the voltage polarity of the sampled outputs to indicate the values of the binary transmitted signals.

10. A transmission system comprising a radio transmitter and receiver, said transmitter including a generator producing positive and negative pulses, suppressed carrier wave modulating means, a source of radio carrier waves connected to said modulator, mark and space keying means for selectively connecting the pulse generator to the modulator so as to change the polarity of said pulses supplied thereto in response to a mark signal, said receiver including radio wave receiving means, a pair of demodulators connected in parallel to said receiving means, a tunable oscillator having two outputs connected in phase quadrature to the demodulators, means for multiplying each pulse signal from the output of one demodulator by the immediately preceding pulse signal from the output of the other demodulator, an automatic frequency control circuit connected from the output of said multiplying means to said oscillator, and means connected to the output of one of said demodulators for multiplying each pulse signal by the immediately preceding signal and determining the transmitted signals.

11. A communication system comprising a transmitter and receiver, said transmitter including a pulse generator, encoding means including selectively operable multiposition switching means for generating any one of a mutually orthogonal set of sequences of two-valued pulses, each position of the switching means representing a signal to be transmitted, a clock, generator connected to said pulse generator and encoding means for synchronizing the same, a suppressed carrier wave modulator, means for supplying the pulses from said pulse generator to said modulator and responsive to the two-valued pulses for changing the modulation of the carrier wave from one fixed value to another whenever said last mentioned pulses have a given one of their two values, and means for transmitting the modulated carrier wave; said receiver comprising means for receiving the transmitted waves, two demodulators connected to the receiving means, a tunable oscillator having connections to the demodulators for supplying thereto, respectively, carrier frequency waves in phase quadrature, delay means having a delay equal to the period of the clock generator, said delay means being connected to the output of one of said demodulators, a combining circuit connected to the output of the delay means and the other demodulator, an automatic frequency control circuit connected between the output of the combining circuit and the oscillator for tuning the latter to the frequency of the received carrier wave, and detecting means connected to the outputs of the delay means and one of said demodulators for deriving the transmitted signals.

12. A system according to claim 11, wherein said receiver includes decoding means for generating an orthogonal set of said sequences of pulses, and said detecting means and said automatic frequency control circuit each including a plurality of channels, each channel including a multiplier circuit, and means for supplying one of said sequences of pulses from said decoding means to each of said last circuits, an integrating circuit connected to the output of each multiplier circuit, switching means for sampling the output of each integrator in the channels of the detecting means at the end of each signal, and switching means for selectively connecting only one of the automatic frequency control channels to the oscillator at the end of each received signal in response to the particular sequence of pulses received.

13. A digital information transmitter comprising a pulse generator, encoding means including selectively operable multiposition switching means for generating any one of a mutually orthogonal set of sequences of two-valued pulses, each position of the switching means representing a signal to be transmitted, a clock generator connected to said pulse generator and encoding means for synchronizing the same, a suppressed carrier wave modulator, means for supplying the pulses from said pulse generator to said modulator and responsive to the two-valued pulses for changing the modulation of the carrier wave from one fixed value to another whenever said last mentioned pulses have a given one of their two values and means for transmitting the modulated carrier wave.